United States Patent [19]

Jensen

[11] Patent Number: 4,954,321

[45] Date of Patent: Sep. 4, 1990

[54] METHOD AND APPARATUS FOR OZONE GENERATION

[75] Inventor: Lonald H. Jensen, Twin Falls, Id.

[73] Assignee: Scott Jensen Industries, Inc., Salt Lake City, Utah

[21] Appl. No.: 328,485

[22] Filed: Mar. 24, 1989

Related U.S. Application Data

[63] Continuation-in-part of Ser. No. 317,215, Feb. 24, 1989, abandoned.

[51] Int. Cl.$^5$ .................... B01J 19/08; B01J 19/12
[52] U.S. Cl. .................... 422/186.19; 422/906; 422/907; 422/186.07; 422/186.08; 422/186.09; 422/186.1; 422/186.11; 422/186.12; 422/186.14; 422/186.18; 422/186.2
[58] Field of Search .................... 422/186.07, 186.08, 422/186.09, 186.1, 186.11, 186.12, 186.14, 186.18, 186.19, 186.2, 906, 907

[56] References Cited

U.S. PATENT DOCUMENTS

| | | |
|---|---|---|
| 1,264,360 | 4/1918 | Begot . |
| 2,732,340 | 1/1956 | Caird .................... 422/186.19 |
| 3,442,788 | 5/1969 | Wooten et al. .................... 422/186.07 |
| 4,049,552 | 9/1977 | Arff . |
| 4,090,960 | 5/1978 | Cooper . |
| 4,156,652 | 5/1979 | Wiest . |
| 4,167,484 | 9/1979 | Morikawa . |
| 4,189,363 | 2/1980 | Beitzel . |
| 4,216,096 | 8/1980 | Paré et al. .................... 422/186.18 |
| 4,230,571 | 10/1980 | Dadd . |
| 4,232,229 | 11/1980 | Tanaka et al. .................... 422/186.2 |
| 4,282,172 | 8/1981 | McKnight .................... 422/186.08 |
| 4,382,044 | 5/1983 | Baumgartner et al. . |
| 4,504,446 | 3/1985 | Kunicki et al. .................... 422/186.19 |
| 4,614,573 | 9/1986 | Masuda .................... 422/186.18 |
| 4,764,349 | 8/1988 | Arff et al. .................... 422/186.18 |

OTHER PUBLICATIONS

"Ozone System Comparison" and two (2) other tracts entitled Ozone, by ClearWater Tech (circa 1988) (brochures).
G. C. White, Handbook of Chlorination (1096).
W. J. Masschelein, Ozonation Manual for Water and Wastewater Treatment (1982).

*Primary Examiner*—Matthew A. Thexton
*Assistant Examiner*—Philip Tucker

[57] ABSTRACT

An ozone generator utilizes one or more cylindrical anodes having disposed centrally therein an elongated cylindrical dielectric tube. The dielectric tube is filled with an inert gas at low pressure and contains at a first end thereof beyond the encirclement of the anode a relatively short electrode. In a preferred embodiment, the electrode takes the shape of a cone having the small end thereof coupled through the first end of the dielectric envelope to a source of high energy alternating electric power. The large end of the cone is open and directed toward the far end of the dielectric envelope. Electrons are emitted from the electrode and focused down the length of the dielectric envelope, creating an electron haze which induces a variety of electron focusing phenomena in an annular reaction space between the dielectric envelope and the encircling anode. These electron focusing phenomena include a corona on the outside of the dielectric envelope, high voltage spikes between the dielectric envelope and anode, and a virtual plasma filling the annular reaction space. The electron focusing phenomena induce ozone formation when oxygen bearing feed gas is pumped down the length of the reaction space. The exterior of the anode is provided with a water jacket for heat removal. Use of the ozone generator in a water purification system is disclosed for illustrative purposes.

89 Claims, 5 Drawing Sheets

METHOD AND APPARATUS FOR OZONE GENERATION

RELATED APPLICATIONS

This is a continuation-in-part application of U.S. patent application Ser. No. 07/317,215 filed on Feb. 24, 1989, now abandoned, in the name of Lonald Hamblin Jensen for an invention entitled "OZONE GENERATION FOR WATER PURIFIERS".

BACKGROUND OF INVENTION

1. Field of the Invention

This invention relates to systems and methods for generating ozone. More particularly, the present invention pertains to tubular ozone generators used in said systems and what is conventionally the cathode or centrally located electrode thereof. Ozone generated by the teachings of the present invention has utility in many potential fields, including the purification of materials, such as water and air.

2. Background Art

Under normal conditions oxygen forms molecules having two atoms. In some circumstances, however, oxygen will form molecules that include three atoms. This form of the element is called ozone. Ozone may be produced by subjecting ordinary oxygen to ultraviolet radiation or to forms of electrical discharges, such as coronas and sparks.

The disinfecting action of ozone is well known and has been used since at least the early 1900's to destroy bacteria and certain viruses in drinking water and in air. Ozone also readily oxidized many compounds which give contaminated water its bad taste or contaminated air its bad odor. The action of ozone in purification is instantaneous, and in its reaction with contaminants, virtually no permanent residual material is formed.

The ozone molecule is unstable and tends to revert spontaneously to the two-molecule form of oxygen. This is particularly true at high temperatures. It is not, therefore, possible to store ozone in the same manner as normal oxygen or in the same manner as other materials, such as chlorine or bromine, that are used to purify air or water. Instead, when it is desired to use ozone in such purification processes, the ozone must be generated at the site where it is to be used. Then the ozone is injected immediately into the fluid being purified.

Major installations that generate ozone electrically conventionally do so by subjecting a feed gas, such as air or an oxygen rich gas, to electrical corona discharges. Using high voltages in the range of about 4,500 volts to about 20,000 volts, currents are caused to flow through such a feed gas between two electrodes. The varieties of ozone generators employing this mechanism are numerous. They include the Otto plate, the Lowther plate, and a tubular type of configuration. The Otto plate is a relatively old technology that has been in use for many years and is slowly being replaced with more efficient and reliable devices. The Lowther plate, on the other hand, is so new as to yet gain widespread acceptance. The tubular type configuration is the most common.

In a tubular ozone generator, an elongated central electrode is operated as a cathode by being subjected to a high voltage relative to an encircling outer cylindrical electrode which is grounded to function as an anode. In the elongated and usually annular reaction space that results between the central cathode and the cylindrical anode, forms of electrical phenomena are thus induced which tend with varying degrees of effectiveness to generate ozone from the feed gas in that reaction space. It has become common to enclose the central cathode terminal in a sealed dielectric envelope, usually made of glass.

Electrical phenomena related to the high voltage applied to the cathode terminal are then contained in the dielectric envelope and do not interact with feed gas to produce ozone. Instead, other corresponding electrical discharges are induced outside of the dielectric envelope by the activity therein. It is there, in an annular reaction space located between the exterior of the dielectric envelope and the interior of the cylindrical anode, that electrical phenomena generate ozone.

In the application of the technology to water purification, devices are designed to generate and inject between 2 and 6 milligrams of ozone per liter of water, with the average level of injection being about 2.4 milligrams per liter. For water treatment plants processing large volumes of water per day, the ozone produced can have daily totals ranging from 500 kilograms (about 1100 pounds) to 4500 kilograms (about 10,000 pounds). Typically, 9 to 12 kilowatt-hours of electric power are required for each pound of ozone generated. Thus, the electrical energy requirements of large water treatment plants utilizing ozone for the purification element can range from 15,000 kilowatt-hours to over a 130,000 kilowatt-hours per day on a continuing basis.

The tendency of ozone to decompose into conventional two-atom molecules of oxygen is accentuated when ozone occurs in high concentration. Additionally, in large volumes of gas containing even relatively unconcentrated volumes of ozone, the ozone molecules tend to seek each other out and thereby decompose into the normal form of oxygen. Accordingly, individual basic ozone generator units are constructed on a small scale, so that the generation product can be immediately and directly injected into the fluid to be purified. A typical basic ozone generator unit is designed to produce ozone in quantities on the order of merely grams per hour.

In large plants, such as those discussed above, a vast number of such small, individual basic units are required to cooperate together to meet the total ozone demand of the plant. Several basic generator units may be grouped together to form large generators, but those large generators are in fact an aggregation of numerous basic units operating in parallel. Not only are energy demands high under such circumstances, but with a large number of basic generating units operating, reliability or the lack thereof is a serious concern, as substantial down time and high maintenance costs can result where each individual piece of equipment experiences even occasional break downs.

In these known devices there is a tendency to combine the outputs of each of the basic generator units before using the combined output to ozonate the water. Surprisingly, combining output streams of ozone-enriched gas in this manner actually reduces the ozone concentration of the combined stream. This is a troublesome source of inefficiency.

Problems apparent in known forms of tubular ozone generators relate primarily to unreliability resulting from the malfunction of the components of the tubular generator and to inefficiency, reflected as low levels of ozone production relative to the amount of electrical energy consumed.

A number of operational phenomena combine to create these problems. For example, in prior devices, the cathode terminal contained in the dielectric envelope generally takes the form of an elongated rod that extended substantially the full length of the envelope. The buildup of heat in the device, and in the cathode terminal itself, results in metal evaporating from the cathode terminal, a process called sputtering. This causes contamination in the interior of the dielectric envelope. In addition, it results in the development of peaks and valleys on the surface of the cathode terminal. When subjected to a high electrical energies, as required for operation of the ozone generator, such peaks and valleys on the surface of the cathode terminal tended to concentrate electric charge, leading to abrupt discharges within the dielectric envelope. Such discharges have the capacity to damage or puncture the dielectric envelope.

This causes shorting to occur through the puncture directly between the cathode terminal and the anode. Such shorts have the capacity to damage the electrical supply equipment, and in particular the transformer, utilized with the ozone generator. Accordingly, known ozone generators must employ costly metal fuses for interrupting the power supply to the cathode in the case of any puncture of the dielectric envelope.

To an extent, the problems associated with cathode sputtering are lessened when an inert gas at a low pressure is introduced into the dielectric envelope. The ability of the inert gas to circulate in combination with its low mass facilitates the dissipation of heat from the dielectric envelope. In each cycle of the alternating operation of the electrical power source for the generator the inert gas has an opportunity to cool and draw heat out of the cathode rod. Furthermore, the presence of the inert gas serves to reduce evaporation and tends to disburse uniformly throughout the dielectric envelope the electrons emitted from the cathode. This expands the cathode to the walls of the envelope, so that peaks and valleys in the inner cathode itself have less consequence.

Nevertheless, even with the introduction of an inert gas into the envelope, failure problems of unacceptable frequency and severity persist. The mass of such cathode terminals taking the form of elongated rods is substantial enough that a significant amount of the inert gas is absorbed by the cathode terminal, disabling optimum functioning. The large cathode terminal resists cooling in each single cycle of the electrical power of the system, and heat naturally builds up. Pitting due to sputtering continues, causing electron concentrations, sparks, and equipment damage. Even if sputtering is reduced, the mass of the cathode terminal continues to be a major source of impurities in the atmosphere within the dielectric envelope. Also large cathode terminals absorb that atmosphere.

To counteract the presence of contaminations in the dielectric envelope, a getter material is included in the interior of the dielectric envelope for absorbing such impurities. Getter material is expensive to obtain and to install. In the case of large cathode terminals, the amount of impurities introduced into the atmosphere in the dielectric envelope can be so substantial as to overwhelm and thus eventually render ineffective any getter included therein.

An additional phenomena in known devices which contributes both to frequent component breakdown and to inefficient ozone production is the generation of nitric acid in the reaction space between the exterior of the dielectric envelope and the cylindrical anode. Nitric acid forms in the reaction area in the presence of newly-generated ozone when that ozone in the presence of humidity attacks the nitrogen in the feed gas. Thus, if feed gas to the ozone generator has an elevated dew point, the electrical phenomena in the reaction space will create droplets of nitric acid in the feed gas. As nitric acid is a conductor, such suspended droplets have a tendency to line up along magnetic lines of force and draw major electrical discharges along the path of increased conductivity that results. Such large electrical discharges tend to localize and concentrate the flow of electrons in the reaction space. Interior to the dielectric envelope this can cause corresponding electrical spikes that attack the integrity of the dielectric tube. Further, nitric acid droplets which reach the sides of the reaction space condense against the walls thereof, chemically corroding those surfaces.

Ultimately, however, the production of nitric acid in any quantity whatsoever represents an inefficient use of energy in the ozone generator. Electrical power consumed in generating the ozone that then produces the nitric acid is energy wasted in relation to desired ozone output.

SUMMARY OF THE INVENTION

One object of the present invention is to produce an improved ozone generator which is highly efficient in its production of ozone relative to its consumption of electrical power.

Another object of the invention is to produce a tubular ozone generator which enjoys minimal maintenance costs and down time by reducing absorption of the atmosphere in the dielectric envelope thereof by the cathode terminal and by reducing the contaminants injected into that atmosphere.

Still another object of the present invention is to produce an ozone generator as described above in which punctures of the dielectric envelope surrounding the central cathode terminal of the generator do not result in voltage surges which threaten peripheral equipment.

Yet another object of the present invention is to produce an ozone generator which requires but a small getter in the dielectric envelope about the cathode terminal thereof or which requires no metal fuse to protect peripheral equipment from punctures of that envelope.

A further object of the present invention is an ozone generator as described above which will permit the use of ambient air as a feed gas.

Yet another object of the present invention is an ozone generator that precludes the buildup of nitric acid in the reaction space of the generator and afford for routine periodic extraction of any acid produced.

It is an overall object of the present invention to produce an ozone generator such as that described above suitable for use in the purification of fluids, such as air or water, and which is inexpensive to manufacture and reliable to operate.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims.

To achieve the foregoing objects, and in accordance with the invention as embodied and broadly described wherein, an apparatus as provided for use with a source of high energy alternating electric power to generate ozone. The apparatus comprises a first electrode and an insulated second electrode opposed thereto. The interval between the first and second electrodes defines a reaction space for receiving oxygenbearing feed gas. The second electrode comprises a sealed dielectric envelope and discharge means for generating an electron haze in the dielectric envelope when the source of high energy alternating electric power is applied between the first electrode and the discharge means. The electron haze is field coupled to the first electrode to induce in the reaction space a virtual plasma with which to generate ozone from the feed gas therein. The electron haze and the virtual plasma generated thereby are believed to be relatively novel phenomena and may be duplicated by the practice of the invention as disclosed herein.

Thus, according to one aspect of the present invention, a discharge means is provided comprising an inert gas under low pressure filling the dielectric envelope and an electrical terminal in a first end of the discharge envelope couplable therethrough to the source of high energy alternating electric power. The electron terminal in combination with its surrounding structure produces in the inert gas an electron haze that fills the dielectric envelope. Typically, the dielectric envelope comprises an elongated tube, and the dimension of the electrode in a direction parallel to the longitudinal axis of the tube is less than or equal to one half of the length of that tube.

In one preferred embodiment of the present invention, the electric terminal is comprises of an electron emitting material formed into a hollow cone. The small end of the cone is coupled to the source of high energy alternating electric power, and the large end of the cone is oriented away from the first end of the dielectric tube. While the electrical polarity between the first and second electrodes is reversible, the first electrode is conventionally grounded, whereby the second or inner electrode functions as a cathode and the first or outer electrode functions as an anode.

Alternatively and in another aspect of the present invention, a cylindrical dielectric envelope for use as the central electrode of a tubular ozone generator is provided with a gun means located at a first end of the dielectric envelope for omitting high energy electrons and for focusing the high energy electrons toward the second end of the dielectric envelope and into an inert gas therein. The electrical phenomenon created thereby in the dielectric envelope induce electron focusing in the reaction space. Such electron focusing comprises a virtual plasma believed to be created by field coupling between a cylindrical outer electrode encircling the dielectric envelope and the contents of the dielectric envelope. The virtual plasma and other forms of electrical focusing present, such coronal discharges and electrical spikes, serve to induce ozone formation at a rate exhibiting unparalleled efficiency.

The present invention also includes a system for purifying a fluid using ozone. Such a system comprises a tubular ozone generator as described above in combination with heat exchanger means located about the exterior of the outer electrode of the ozone generator, a ventilation means for advancing a feed gas containing oxygen through the reaction space from one end of the outer electrode to the other end, and mixing means for injecting into the material gas that has passed through the reaction space. In one embodiment of such a system, the mixing means comprises an injection chamber connected to the reaction space and an aspiration jet located in the injection chamber through which the fluid is passing.

According to another aspect of the present invention, a method is provided for purifying a fluid using ozone. The method comprises the steps of supply a feed gas containing oxygen to one end of at least one elongated reaction space created between a cylindrical outer electrode and a dielectric envelope located therein and filling the dielectric envelope with an inert gas. Further, the method includes the step of applying a high voltage alternating power source to an electron gun located at one end of the dielectric envelope. This causes electrons to be emitted from the electron gun and focused into the dielectric envelope in alignment with and parallel to the longitudinal axis thereof. As a result, an electron haze in the dielectric envelope is created which induces electron focusing in the reaction space for generating ozone from the feed gas. Finally, the method includes the steps of injecting ozone generated in the reaction space into the fluid to be purified and cooling reaction chamber with a fluid heat exchanger.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are therefore not to be considered limiting of its scope, the invention will be described with additional specificity and detail through the use of the accompanying drawings in which.

DESCRIPTION OF THE PREFERRED EMBODIMENTS

Figure 1:
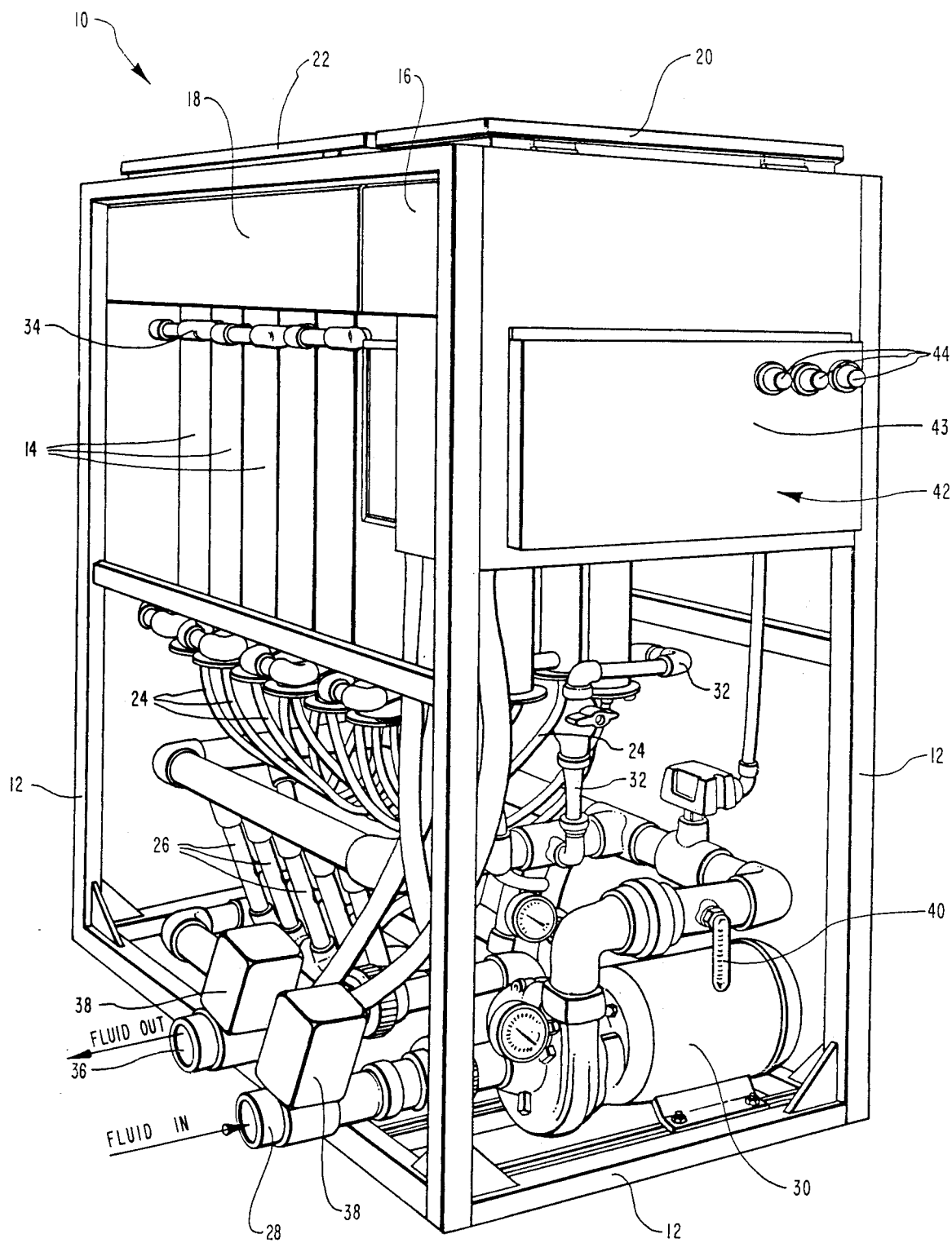
FIG. 1 is a perspective view of one embodiment of an ozonation apparatus incorporating teachings of the present invention.

Shown in FIG. 1 is a first embodiment of an ozonation apparatus 10 specifically adapted for use in purifying a fluid, such as water. While the methods and apparatus of the present invention find ready application in the field of water or air purification, the present invention by providing a reliable, highly efficient means to produce ozone in substantial quantities is contemplated as having utility in any field in which complete oxidation of a material is desirable, for purification or other refining purposes.

The invention to be disclosed is thus not limited by the purpose to which it is disclosed herein as being applied. Rather the present invention includes the method and apparatus of the disclosed invention however used for the purpose of ozonizing any material whatsoever. While specific aspects of ozonization may vary from one application to another, the teachings of the present invention regarding the efficient and reliable generation of ozone in substantial quantities is nevertheless anticipated to constitute a core component of a diverse variety of future successful ozonization systems. Therefore, the specific embodiments of applications of the present invention, while illustrating one environment for its use are not limiting of the breadth thereof.

Referring to FIG. 1, ozonization apparatus 10 comprises a frame 12 within which are mounted the elements of a system for purifying water with ozone generated in the manner of the present invention. In the upper portion of frame 12 are supported a plurality of tubular ozone generator units 14 which are supplied with high energy alternating electric power through a transformer housed in a transformer compartment 16 at the top of frame 12. Ambient air is supplied to tubular ozone generator units 14 through a plenum or air intake chamber 18 directly thereabove. Both transformer compartment 16 and air intake chamber 18 are provided with an easily removable access lid 20, 22, respectively.

During the operation of ozonization apparatus 10, feed gas comprising ambient air passes from air intake chamber 18 to and through tubular ozone generators 14. There ozone is efficiently generated from free oxygen in the manner yet to be disclosed below in detail. Ozone-enriched gas emerging from the bottom of tubular ozone generator units 14 is immediately injected into water by way of injection tubes 26, which operate on venturi principles.

Due to the short lifetime of ozone in any concentration in a gaseous mixture, the time between ozone generation and the mixing of the ozone with the fluid to be purified is advantageously to be minimized. The arrangement shown in FIG. 1 of tubular ozone generator units 14 and the flow of water to be purified by ozone generated therein contributes to this desirable result.

Water to be purified enters ozonization apparatus 10 through input water main 28 and is advanced by pump 30. Portions of the water passing through ozonization apparatus 10 are diverted through heat exchanger intake pipes 32 into shell-and-tube heat exchangers built into each tubular ozone generator unit 14. The water thus diverted serves to cool tubular ozone generator units 14 of heat created in generating ozone. Water bearing unwanted heat from tubular ozone generator units 14 emerges therefrom at heat exchanger outlet pipes 34 and is rejoined with the main flow of water through ozonization apparatus 10. The injection of ozone-enriched gas into this water, which occurs at injection tubes 26, involves a second portion of the water flowing through ozonization apparatus 10. Once the ozone generated in tubular ozone generator units 14 is mixed with the second portion of the water, that second portion is then rejoined with the main flow in order to effect additional mixing and purification.

According to one aspect of the present invention, however, the injection of ozone preferably occurs without combining the ozone-enriched gas from each of supply tubes 24, in to a single flow. Rather injection is effected directly from each tubular ozone generator 14 into the water. It has been found that efforts to combine separate streams of ozone-enriched gas prior to ozonation merely results in the wasteful annihilation of ozone. For example, the combining of two streams of gas containing 1% ozone may typically result in a single stream having only a 1.2% concentration of ozone, rather than the 2% concentration that might otherwise be expected to result. Accordingly, wherever possible the method of the present invention involves the addition of ozone from single ozone generation sites, such as tubular ozone generator units 14, directly into the fluid to be ozonated.

Thorough mixing of water from injection tubes 26 with the balance of the water processed by ozonization apparatus 10 can be effected by returning that ozonated water to the cooling water in heat exchanger intake pipes 32. Thereafter, mixing takes place in the shell-and-tube heat exchangers of tubular ozone generator units 14 before the cooling water involved is returned to the main flow of water in ozonization apparatus 10. Ultimately, the full flow of water is thoroughly ozonated and emerges from ozonization apparatus 10 through output water main 36. Valves 38 control the water flow rate in both input and output water mains 28, 36, respectively.

This inflow of water is continually evaluated for its oxidation reduction potential by a redox monitor 40 located on circulated water pipe 41 which is fed by pump 30 with incoming water from input water main 28. The oxidation reduction potential of water is indicative of the amount of impurities needing to be removed to produce water that is pure. Using data from monitor 40, the operation of ozonization apparatus 10 is managed in an automatic fashion from electronic controls in an electronic control box 42 located at the front of ozonization apparatus 10. The cover 43 to electronic control box 42 includes a plurality of lights 44 capable of giving visual indications of the status of the operation of ozonization apparatus 10.

Figure 2:
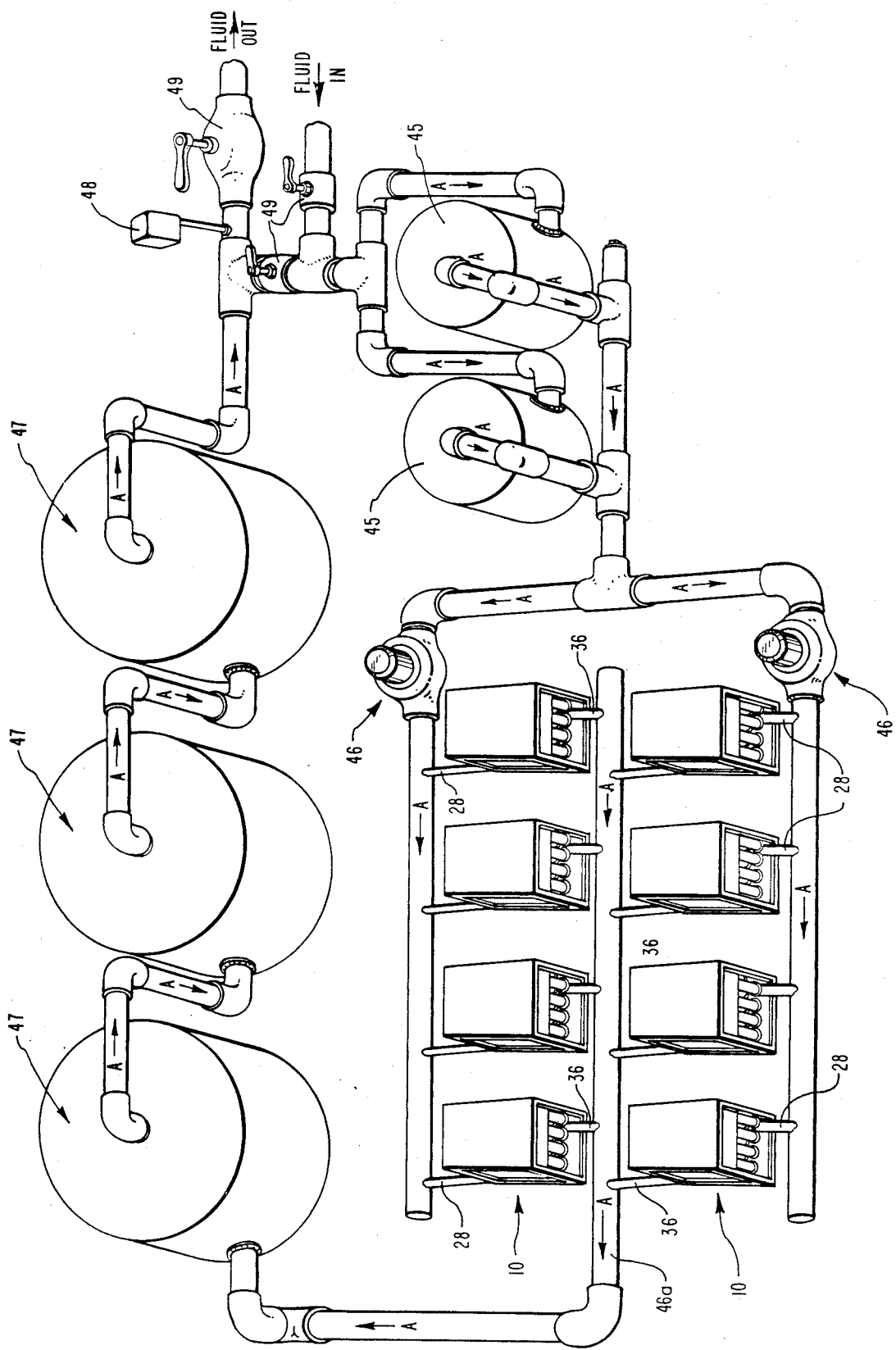
FIG. 2 is a schematic view of a plurality of ozonation apparatus such as that shown in FIG. 1 assembled into a system for purifying large quantities water.

FIG. 2 illustrates the use of a plurality of ozonation apparatus 10 in a large system for water purification. There, water enters the purification system through a pair of filter tanks 45 and is advanced through the system under the influence of two pumps 46 in the direction illustrated by arrows A. After passing through the eight parallel-connected ozonation apparatus 10, ozonated water is collected therefrom in an output header 46a and agitated to improve oxidation from the ozone by passage through three serially connected mixing tanks 47. The oxidation reduction potential of the outgoing water is measured on a continuing basis by a monitor 48. Various valves 49 regulate the flow of water in and between the ingoing and outcoming legs of the system.

Figure 3:
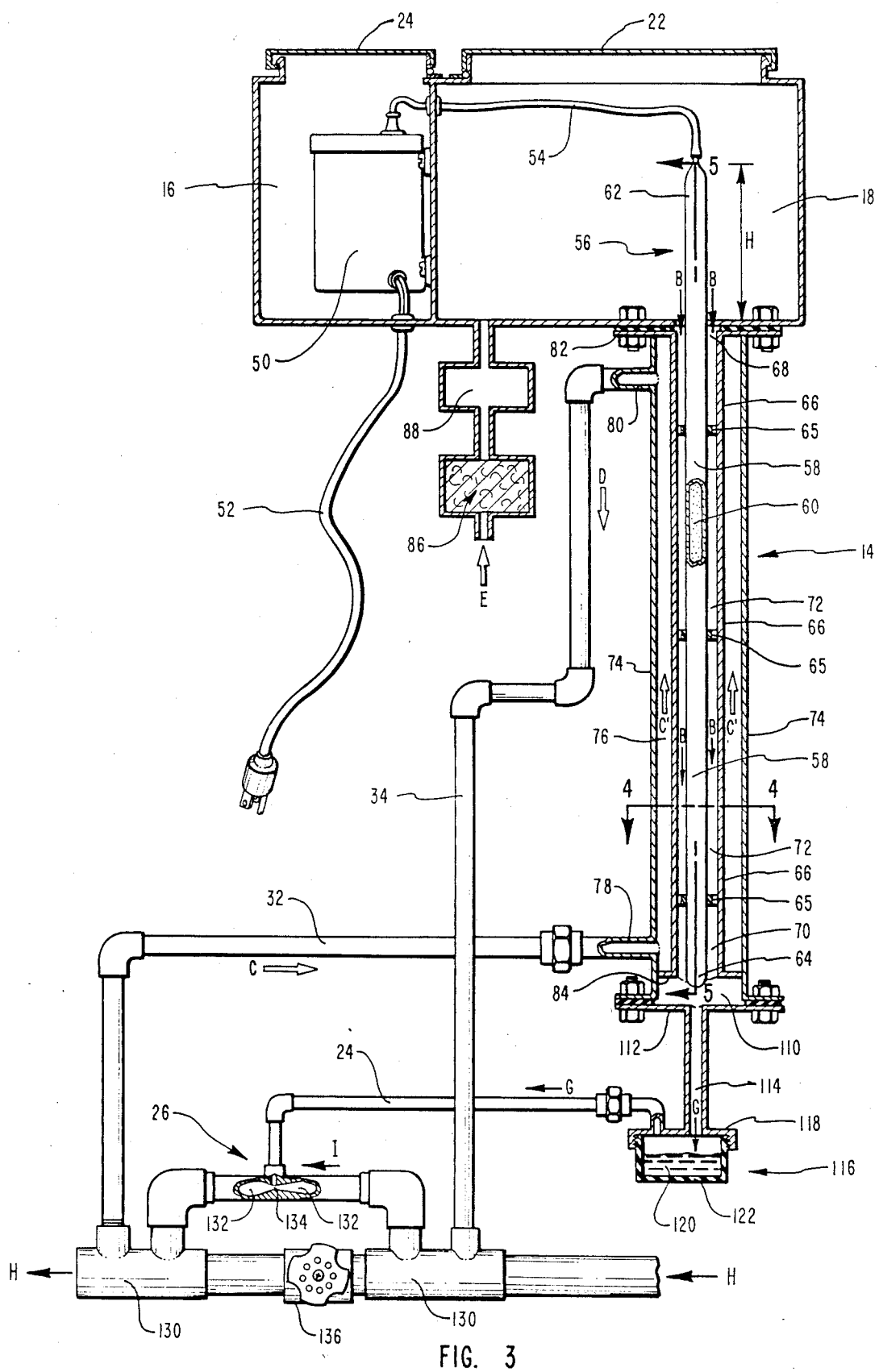
FIG. 3 is a cross-sectional elevation view partially in schematic form of selected portions of one embodiment of a single tubular ozone generator unit from the ozonation apparatus of FIG. 1 incorporating teachings of the present invention and illustrating the interconnections to sources of feed gas and to a supply of water that permit the ozone generator to function in a system for purifying water.

A better understanding of additional inventive aspects of ozonization apparatus 10 can be derived by reference to FIG. 3 in which selected portions of the structure of ozonization apparatus 10 are shown in cross-sectional elevation view, while to enhance clarity other components thereof are depicted in schematic fashion. FIG. 3 thus includes an elevational cross section through a single tubular ozone generator unit 14 and heat exchanger intake pipe 32 and heat exchanger outlet pipe 34 associated with the shell-and-tube heat exchanger therefor. Also illustrated are plenum or air intake chamber 18 and transformer compartment 16 above tubular ozone generator unit 14.

High energy alternating electric power is provided to tubular ozone generator 14 from a transformer 50 housed in transformer compartment 16. Transformer 50 is couplable by power cord 52 to a conventional supply of electric power. Preferably, transformer 50 is a non-current limited transformer having reliable dielectric characteristics, capable of stepping up to voltages in the range of 4,500 to 12,000 volts conventional 110-volt or 220-volt power supplied to transformer 50 through cable 52. The high-voltage output from transformer 50 is then supplied over a high-voltage cable 54 coupled thereto to inner electrode 56 of tubular ozone generator 14.

According to one aspect of the present invention, an inner electrode, such as inner electrode 56, for a tubular ozone generator unit comprises an envelope means for containing high energy electrical phenomena and a carrier means therein for defusing said high energy electrical phenomena throughout the interior thereof. As shown by way of example and not limitation, a dielectric envelope in the form of an elongated cylindrical glass tube 58 is provided and filled with a gas 60. Tube 58 need not be transparent, but may be fabricated from a number of dielectric material other than glass which are durable in the environment of ozonation apparatus 10. Gas 60 may comprise any inert gas, such as argon, which is presently preferred, alone or in mixture with other trace gasses or mercury. Both first end 62 and second ends 64 of tube 58 are closed, whereby to contain electrical phenomenon generated by structures to be disclosed in detail subsequently.

Surrounding tube 58 and coaxially aligned therewith is an elongated cylindrical outer electrode 66 having opposed open first end 68 and second end 70. Outer electrode 66 is most usually grounded relative to the high energy electric power supply tube inner electrode 56. First end 68 of outer electrode 66 opens directly into air intake chamber 18, thereby to receive into an elongated reaction space 72 between outer electrode 66 and the exterior of tube 58 feed gas containing free oxygen. Such feed gas flows through the length of reaction space 72 in the direction indicated by arrows B. Ozone generation occurs there in a manner to be described presently. Ozone-enriched gas emerges from reaction space 72 at second end 70 of outer electrode 66. Spacers 73 carried on tube 58 maintain the separation between the tube and outer electrode 66 that results in creating reaction space 72.

External to, but spaced apart from, outer electrode 66 is a housing 74 which defines on the exterior of outer electrode 66 a cooling water jacket 76 for circulating water. Water in water jacket 76 removes heat generated in the process of creating ozone in reaction space 72.

Water traveling in the direction indicated by arrow C enters cooling channel 76 at water inlet 78 connected to heat exchanger intake pipe 32 at the bottom of housing 74 and exits cooling water channel 76 in the direction indicated by arrow D at water outlet 80 connected to heat exchanger outlet pipe 34 at the top of housing 74. Housing 74 and outer electrode 66 are attached by welding or other means to an upper mounting flange 82 at the end of tubular ozone generator unit 14 adjacent to air intake chamber 18. Correspondingly, housing 74 and outer electrode 66 are attached to an annular plate 84 at the end of tubular ozone generator unit 14 remote from air intake chamber 18 to complete water cooling jacket 76.

The cooling water circulating in cooling water jacket 76 serves to protect the components of tubular ozone generator unit 14 from the adverse consequences of heat accumulation. As increases in temperature in reaction space 72 tend to decrease the rate at which ozone is generated and in addition increase the rate at which nitric acid is produced, cooling water jacket 76 contributes to the efficient operation of tubular ozone generator unit 14. The annular reaction space between tube 58 and outer electrode 66 is maintained by spacers 73 which may be mounted upon tube 58 and configured to permit feed gas to travel through reaction space 72.

The spacial relationship among tube 58, outer electrode 66, and housing 74 are shown to additional advantage in the cross-sectional view found in FIG. 3. Tube 58 is filled with gas 60, while actual ozone generation takes place in reaction space 72 between the outside of tube 58 and the inside of outer electrode 66. Water circulates in cooling jacket 76 inside housing 74 but on the exterior of outer electrode 66. Spacers 73 maintain the annular separation that forms reaction space 72.

Some variations of these spacial relationships that are considered to be within the scope of the present invention deserve mention. First, while in the embodiments disclosed herein tube 58 is disposed coaxially within outer electrode 66, this need not necessarily be the case. Unlike known ozone generators, which operate on principles which are extremely sensitive to spatial tolerances, the present invention does not require that the outer electrode be centered about tube 58. Thus, as long as tube 58 is comprised of an adequately strong dielectric it may be located anywhere within outer electrode 66, including quite surprisingly, in contact therewith. Thus, reaction space 72 can take a number of shapes other than that of a strict annulus as shown in the embodiments disclosed herein. Outer electrode 66 and inner electrode 56 need not even be separated by a physical gap. The reaction space in which ozone would be generated under such circumstances would merely comprise all of the space bounded by contacting surfaces of the two contacting electrodes.

It also should be noted that, while in the presently disclosed embodiments inner electrode 56 is shown connected to a source of high voltage relative to outer electrode 66, this is done not out of necessity with regard to obtaining the ozone generation results desired, but due to convenience and safety considerations. Apart from the other structures shown, for example in FIG. 3, outer electrode 66 can be coupled to a source of high energy alternating electric power in relation to a grounded inner electrode 56, and similar ozone generation consequences are observed. Under such conditions, outer electrode 66 could be said to function as a cathode, while inner electrode 56 functions as an anode. The arrangement of these two elements in the embodiments disclosed herein has the advantage, however, of containing within outer electrode 66 all electrical phenomena caused by operation of the device. By grounding outer electrode 66, no exceptional safety measures are required for protecting personnel operating the equipment, and fluid may be circulated in a cooling jacket in direct contact with outer electrode 66 without the requirement for field or electrical insulation therebetween.

All materials used in the construction of tubular ozone generator 14 are resistant to ozone and the byproducts of ozone generation, such as nitric acid. Tube 58 is fabricated of glass or other such ozone-resistant material, while spacers 73 are composed of an ozone-resistant material, such as polyvinylidene chloride or PVDF, available under the trade name Kynar TM. Outer electrode 66 and housing 74 are preferably fabricated from metals from the 300-series of stainless steel. These metals are both corrosion resistant and easy to weld. Type 316 stainless steel has been found to be particularly functional in this regard. In some applications, it may be desirable to coat at least the inner surface of outer electrode 66 with a dielectric, such as glass, to prevent the entrainment of metal atoms in the feed gas flowing in reaction space 72.

Although it is generally anticipated that ambient air will suffice as the feed gas supplied from air intake chamber 18 to reaction space 72, where requirements for high ozone yields exist, pure oxygen can be used for the feed gas, if doing so can be economically justified. It is recommended that to avoid clogging and wasted electrical energy consumption, the feed gas entering air intake chamber 18 be cleansed of particulate matter by a filter 86 shown schematically in FIG. 2. The entry of feed gas into filter 86 and air intake chamber 18 is indicated in FIG. 2 by arrow E.

Optionally, the feed gas may further be pretreated by extracting moisture therefrom in a dryer 88. It is to avoid nitric acid production that feed gas is usually pretreated by drying. Optimally, drying should occur to a dew point of $-65°$ C. or less, but it is a surprising and economically advantageous result of the practice of the present invention that the manner in which ozone is generated therein results in the production of relatively small quantities of nitric acid. The precise reason for this salutary result in the ozone generator of the present invention is not entirely understood, but is believed to be at least partially a result of the low operating temperatures which are maintainable in reaction space 72 during practice of the present invention.

According to another aspect of the present invention, cathode 56 of tubular ozone generator unit 14 is provided with a gun means located at one end of the envelope means of the present invention for emitting high energy electrons and for focusing the high energy electrons toward the other end of envelope means and into the carrier means. In this manner, a plurality of yet to be fully understood electrical phenomena occur in the envelope means. These phenomena correspondingly induce various forms of electron focusing in the reaction space outside of the envelope means.

It should be understood that the term "electrical phenomena", as applied to electrical activity in the envelope means, and the term "electron focusing", as applied to electrical activity in reaction space 72, are broad terms inclusive of both forms of electrical activity known to occur in such environments and forms of electrical activity which appear at the present to possess a degree of electrical novelty and which are yet to be fully understood either as to cause or effect. For want of any existing terms with which to refer to these seemingly novel forms of electrical activity, this specification and the claims hereafter will adopt and attempt to consistently utilize the newly coined expressions "electron haze" and "virtual plasma". "Electron haze" will refer to the seemingly novel electrical phenomena observed within the envelope means when configured according to the teachings of the present invention. "Virtual plasma" will be used to refer to the seemingly novel electrical phenomena observed to occur in the reaction space outside the envelope means and believe to arise as a result of the electrical phenomenon, including the electron haze, established inside the envelope means.

Figure 4:
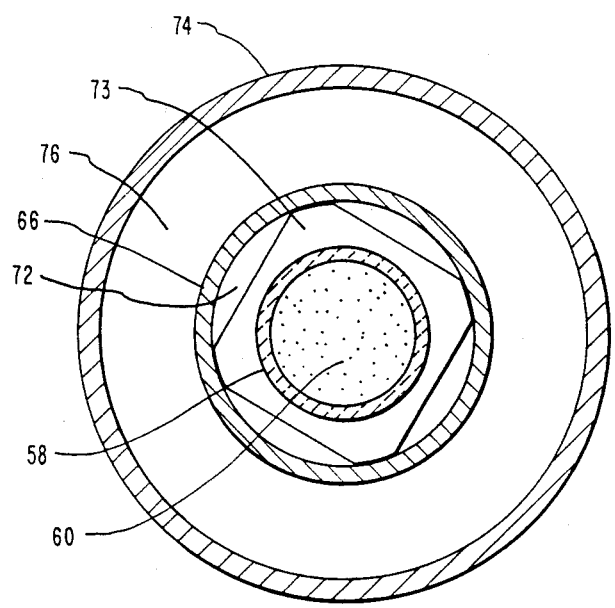
FIG. 4 is a detailed cross-sectional elevation view of the inner electrode of the ozone generator unit shown in FIG. 3 and taken along section line 4—4 therein.
Figure 5:
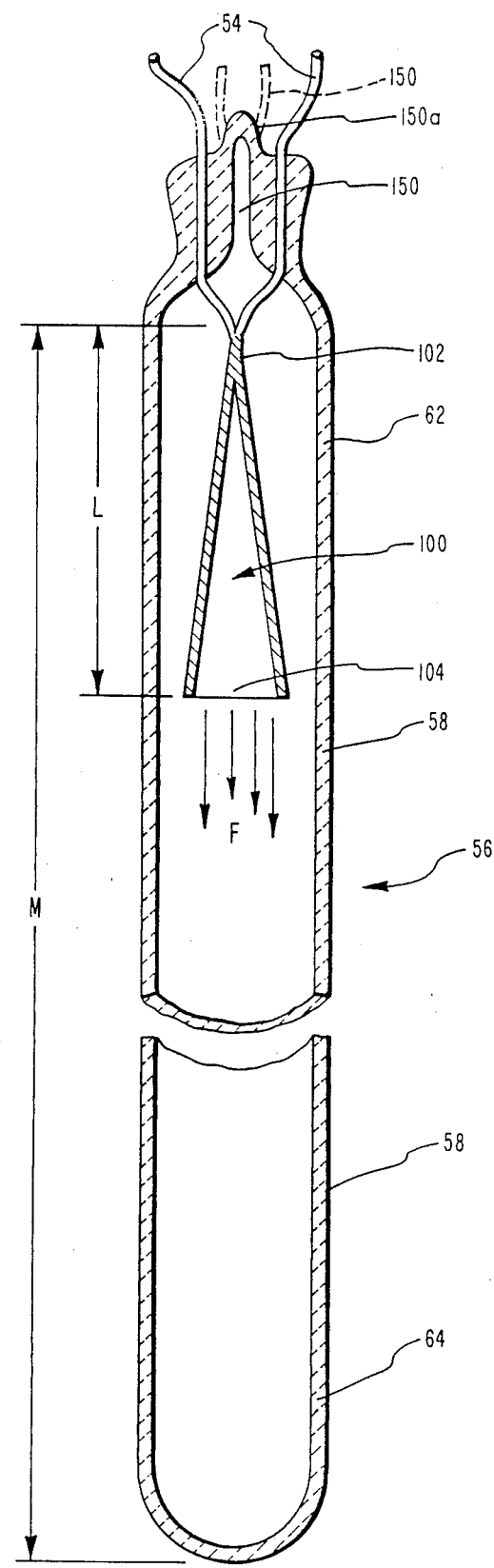
FIG. 5 is a cross-sectional plan view of the ozone generator unit shown in FIG. 3 taken along section line 5—5 shown therein.

As shown in FIG. 4 by way of example and not limitation, a terminal 100 is hermetically sealed in first end 62 of tube 58 and connected to high voltage cable 54 sealingly passing thereinto. When high energy alternating electric power is thusly applied to terminal 100, electrons are believed to be emitted therefrom and focused into the gas 60 in tube 58, establishing a variety of electrical phenomenon throughout the dielectric envelope presented by glass tube 58.

Among the electrical phenomenon resulting in tube 58 from this emission of electrons from terminal 100 appears to be the electron haze mentioned above. In operation, the electron haze observed has had a mild pink or purplish glow which extends throughout the full length of tube 58. The phenomena does not generate substantial amounts of heat, but can be felt from the exterior of tube 58 to be capable of inducing corresponding electrical activity on the exterior of tube 58. It is believed that the low-temperature aspect of the electron haze is a substantial factor in the long term reliability of tubes, such as tube 58, incorporating teachings of the present invention.

In addition to the electron haze, however, other electrical phenomena have been observed or detected in tube 58 when structured with an inert gas and a terminal, such as terminal 100. The measurement of voltages in tube 58 based on probes attached to the primary of transformer 50 indicates that intermittent voltage spikes occur in the atmosphere in tube 58. These voltage spikes vary in voltage in a broad range of about 40,000 to 100,000 volts, and therewithin from about 45,000 to 80,000 volts, or more narrowly from about 50,000 to 65,000 volts. The precise mechanism causing the observed voltage spikes is unknown at the present time, but it is felt that one aspect of the high efficiency ozone generation effected in the present invention is due at least in part to electron focusing induced in reactor space 72 corresponding to the voltage spikes in tube 58.

Whatever the nature of the electrical activity created in tube 58, be it corona discharge, electron haze, or high voltage spikes, a variety of forms of electron focusing result therefrom in reaction space 72. It is these forms of electron focusing that actually generate ozone from the oxygen in the feed gas supplied thereto. One form of electron focusing that appears to be created in reaction space 72 is coronal discharges induced on the outer surface of tube 58.

In addition, intermittent, high voltage spikes are produced periodically from the exterior of tube 58 to cylindrical outer electrode 66. It is presumed that such forms of electron focusing in reaction space 72 are created by the high voltage spike observed inside tube 58. If sustained, voltage spikes of the magnitudes observed normally prove destructive in known ozone generation devices. For reasons also not fully understood, however, these voltage spikes are not sustained, either in time or in location, but appear to occur randomly in the physical space of tubular ozone generator 14.

Scrutiny of tubular ozone generator 14 during operation reveals in addition the development of a virtual plasma in reaction space 72. The virtual plasma also exhibits a soft glow and is found throughout the full length of reaction space 72. It has been concluded, however, due to the dramatic increase in ozone generation effectiveness attainable through structures rendered according to the teachings of the present invention, that this virtual plasma presents a physical phenomena for inducing ozone generation, distinct from known physical phenomena, such as ultraviolet light and corona discharge. The virtual plasma presumably arises due to the strong field coupling created between outer electrode 66 and the electrical phenomena, including the electron haze, in inner electrode 56. These two components of tubular ozone generator unit 14 are thought to function in some respects as opposite plates of a capacitor subjected to a high energy electromotive potential.

While known tubular ozone generator units function at an efficiency level of nine to twelve kilowatt-hours for each pound of ozone produced, the electron focusing produced in reaction space 72, however it is caused, results in ozone generation at a surprisingly efficient rate of 6.8 kilowatt-hours per pound. Accounting for the energy drain of peripheral devices, such as pump 30, this figure is believed to be more accurately reflected as 4.3 kilowatt-hours per pound of ozone produced.

An electrode, such as terminal 100, according to the present invention, may take a variety of forms. In an overall sense, however, terminal 100 is relatively small in extent compared to the extent of the dielectric tube in which it is utilized and optimally possessed of only a slight mass. Known cathode terminals traverse substantially the entire length of the dielectric envelopes with which they are employed and consequently are necessarily either of substantial mass or delicate structure. Generally, the length L of electrode 10 taken in a direction parallel to the longitudinal axis of tube 58 should be less than or equal to one-half the length M of tube 58 itself, or preferably in longer tubes less than or equal to one-fifth, one-tenth, or even one-twentieth of the tube length M.

In this matter, the mass of electrode material contained in tube 58 is substantially reduced relative to the type of cathode employed in known ozone generators. This reduction in mass has a number of beneficial effects. First, less heat is generated in the metal material of the electrode itself. This results in more effective cooling of the electrode during the alternating cycles of the power supplied, which in turn reduces electrode sputtering. Secondly, less electrode material means that less absorption will occur of the gas 60 filling tube 58. Finally, a smaller electrode predictably leads to less contaminants in the atmosphere in inner electrode 56 and the need for less getter material with which to counteract such contamination. These factors contribute to lower costs of fabrication and to substantial enhancements in operating lifetime, which in turn reduces operating costs.

While in the embodiments illustrated herein, terminal 100 is located in one end of the dielectric envelope in which it is housed, this need not be true always, and has been adopted herein primarily out of a concern for adequacy of its support within the dielectric envelope and the ease of manufacturing same.

It is presently preferred to utilize an electrode having a cross section in a plane normal to the longitudinal axis of tube 58 which is similar in shape to the cross section of tube 58. Thus, in FIG. 4, both terminal 100 and tube 58 have circular cross sections. This is because tube 58 is cylindrical and because terminal 100 as shown in FIG. 4 takes the form of a cone connected at the small end 102 thereof to high voltage cable 54. The large end 104 of terminal 100 is oriented away from first end 62 of tube 58, toward second end 64 thereof. The inventive design disclosed herein is not, however, limited to such a terminal configuration or orientation.

In all but the lowest voltage applications of the present invention, terminal 100 is housed in a portion of inner electrode 56 which extends a distance H above first end 68 of outer electrode 66. Distance H places the connection point of high voltage cable 54 to inner electrode 56 far enough above the lower floor of air intake chamber 18 to prevent sparking therebetween.

Tube 58 is manufactured in substantially the same manner as the luminous tubes for signage are produced. First, tube 58 is fabricated and sealed at one end. Terminal 100 and high voltage cable 54 therefore a cast into the other end of tube 58, which is then provided with a temporary processing tubulation 106 of relatively small diameter. Attached to a vacuum processing station tube 58 is evacuated by means of processing tubulation 106 and is heated to drive off unwanted gases from the materials thereof. Then tube 58 is filled through processing tubulation 106 with an inert gas, such as argon, or any other rare inert gas, and possibly with a quantity of mercury. The pressure of the back filled inert gas is adjusted as desired, within a range of less than 100 millimeters mercury. Thereafter processing tubulation 106 is sealed off leaving a short appendage 108.

Terminal 100 is comprised of an electrode emitting material, such as, but not limited to, nickel, iron, and steel. Thereby application of high energy alternating electric power to terminal 100 results in electrons being emitted therefrom. The shape, position, and orientation of terminal 100 causes these electrons to be emitted in alignment with or parallel to the longitudinal axis of tube 58 as indicated by arrows F shown in FIG. 4. During the travel of electrons emitted from terminal 100 in the direction of second end 64 of tube 58, diffusion of the electrons occurs due to collisions thereof with gas 60 filling tube 58, so that a voltage drop of approximately 200 volts per foot of length of tube 58 from large end 104 of terminal 100 is experienced.

One safety and economy feature of an ozone generator configured according to the teachings of the present invention relates to how such an ozone generator functions when puncturing of tube 58 does occur. Although this form of mechanical breakdown has been observed to be very rare in the inventive generator, when it does occur, the event is far less cataclysmic than it is in know generators that employ lengthy rod-type cathode terminals in a central dielectric envelope. Rather than becoming the pathway for a standing short between the cathode terminal within the dielectric envelope and the anode exterior thereto, a puncture in the wall of tube 58 just terminates all electrical discharge, without a short.

This is because once gas 60 has escaped from tube 58, electrons emitted from terminal 100 cease to be capable of setting up the electron haze normally created therein. As it is that electron haze that is responsible for inducing corresponding electrical focusing in reaction space 72, the escape of gas 60 causes all electron phenomena to terminate, without risking any additional potential damage to the electrical supply equipment. No standing short is created. This obviates the need for expensive metal fuses commonly required in the supply circuitry for dielectric envelopes housing long coextensive rod-type cathode terminals.

Returning again to FIG. 3, it will be observed that below annular flange 84 at second end 70 of outer electrode 66 is a receiving chamber 110 for ozone-enriched feed gas emerging from the end of reaction space 72 remote from air intake chamber 18. Receiving chamber 110 is hermetically sealed by a lower mounting flange 112 through which is formed an exit duct 114. The lower end of exit duct 114 opens into an acid trap 116 through a cap 118. Ozone-enriched feed gas out of reaction space 72 passes through exit duct 114 in the direction indicated by arrows G into acid trap 116. The ozone-enriched feed gas continues to injection tube 26 through supply tube 24.

As mentioned earlier, in many applications of the present invention ambient air used as the feed gas in tubular ozone generator 14 may be so saturated with humidity as to produce large quantities of nitric oxide. By orienting tubular ozone generator unit 14 in the vertical manner shown in FIG. 2, excessive quantities of this byproduct drain out of reaction space 72 into acid trap 116. The nitric acid 120, however, accumulates in collecting vessel 122 which rendered selectively removed from cap 118 by cooperative threadings and may thus be periodically emptied. Alternate arrangements for emptying acid trap 116, such as siphons or spigots, are equally workable.

The resulting benefits are two-fold: first, the distorting conductive presence of nitric acid in reaction space 72 is thereby reduced or eliminated; second, the corrosive effects of the acid on the components of tubular ozone generator 14 are reduced. By providing a method for easily removing acid or other corrosive byproducts, the present invention represents an improvement over existing generators, as it renders practical the use of ambient air as a feed gas. Nevertheless, as has been mentioned above, due to other aspects of the present invention, the creation of nitric acid in reaction space 72 has been found to be relatively minimal. In many instances neither an intake air pretreatment drier 88 nor an acid trap 116 are required, except in consistently and excessively humid climates.

Figure 6:
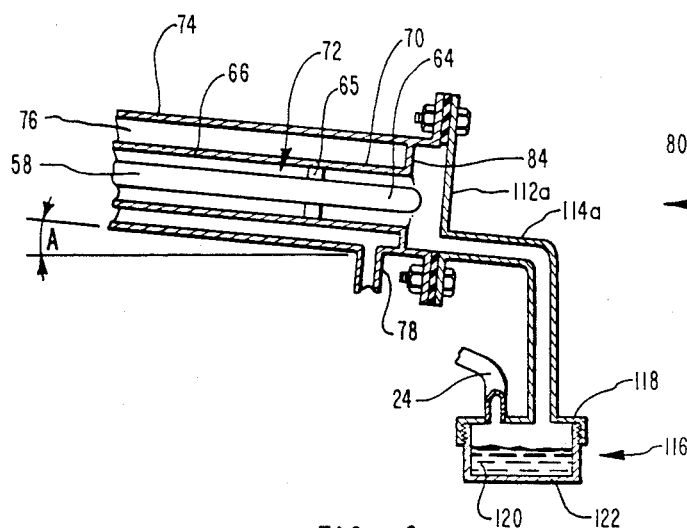
FIG. 6 is a detailed cross-sectional elevation view of an acid trap adapted for use with a non-vertically oriented ozone generator unit of the type shown in FIG. 2.

In some situations the overhead clearance available for the installation of an ozonation apparatus according to the teachings of the present invention may be extremely limited. Then, the vertical ozone generator orientation shown in FIG. 2, which contributes to the removal of acidic byproducts from reaction space 72, may not be achievable. Nevertheless, under such circumstances the tubular ozone generator may be mounted in a nearly horizontal position having just enough slope to cause any acid formed during operation to flow toward the lower end of the annular reaction space therein. As shown in FIG. 6, wherein identical reference characters have been used to refer to structures identical to those described and identified previously, a tubular ozone generator 14 is inclined relative to the horizontal at an angle A. An angle A in the range of approximately 5° to 90° will permit the drainage of acid from reaction space 72. In the embodiment shown in FIG. 6, in order to effect efficient acid extraction in connection with acid trap 116, it is only necessary to relocate to the degree illustrated the point at which an exit duct 114 passes through a lower mounting flange 112.

According to the teachings of the present invention, a ventilation means is provided for advancing a gas containing oxygen through reaction space 72 from first end 68 to second end 70 of outer electrode 66. Returning to FIG. 3, supply tube 24 is seen to lead from acid trap 116 to injection tube 26. Injection tube 26 is connected in parallel to a water main 130 through which water to be sterilized in the ozonation apparatus illustrated flows in the direction shown by arrows H. As shown in the cut-away portion thereof, injection tube 26 includes a pair of aspirators 132 on either side of a venturi chamber 134 to which supply tube 124 is connected. This arrangement feeds ozone-enriched feed gas from tubular ozone generator 14 into the water moving through aspirators 132 in the direction indicated by arrow I. Injection tube 26 is thus the motivator for drawing feed gas through reaction space 72 from air intake chamber 18.

This use of a negative pressure to advance the feed gas, once enriched with ozone, represents a safety feature in relation to using positive pressure to advance the ozone. Should water flow cease, so then does the flow of ozone. In this manner ozone is not pumped into the atmosphere surrounding the ozonation unit.

As illustrated in FIG. 3 it is frequently convenient to inject ozone through injection tube 26 at a point in the flow of water that is just upstream of the point at which a portion of that flow is diverted into heat exchanger intake pipe 32 to pass in the direction shown by arrow C to cooling water jacket 76. The passage of water through cooling water jacket 76 in the direction shown by arrows C' results in substantial turbulence which thoroughly mixes therewith the ozone entered in injection tube 26. Thereafter, water is returned to water main 130 from cooling water jacket 76 through heat exchanger outlet pipe 34 in the direction shown by arrow D.

Alternately, all water passing through injection tube 26 may thereafter be directly routed through heat exchanger intake pipe 32 to insure substantial and thorough mixing. As a further convenience, a valve 136 can be installed in water main 130 between the opposite ends of injection tube 126. The adjustment of valve 136 will then result in the selective variation of the pressure and speed of water passing through injection tube 126. This in turn can regulate the rate at which feed gas is drawn from reaction space 72.

Figure 8:
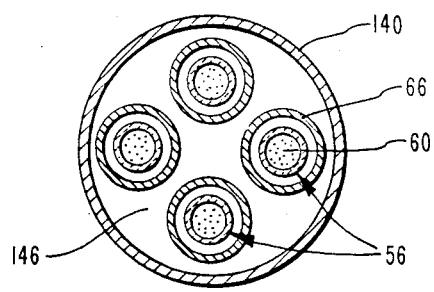
FIG. 8 is a cross-sectional plan view of the ozone generator unit shown in FIG. 7 taken along section line 8—8 shown therein.
Figure 7:
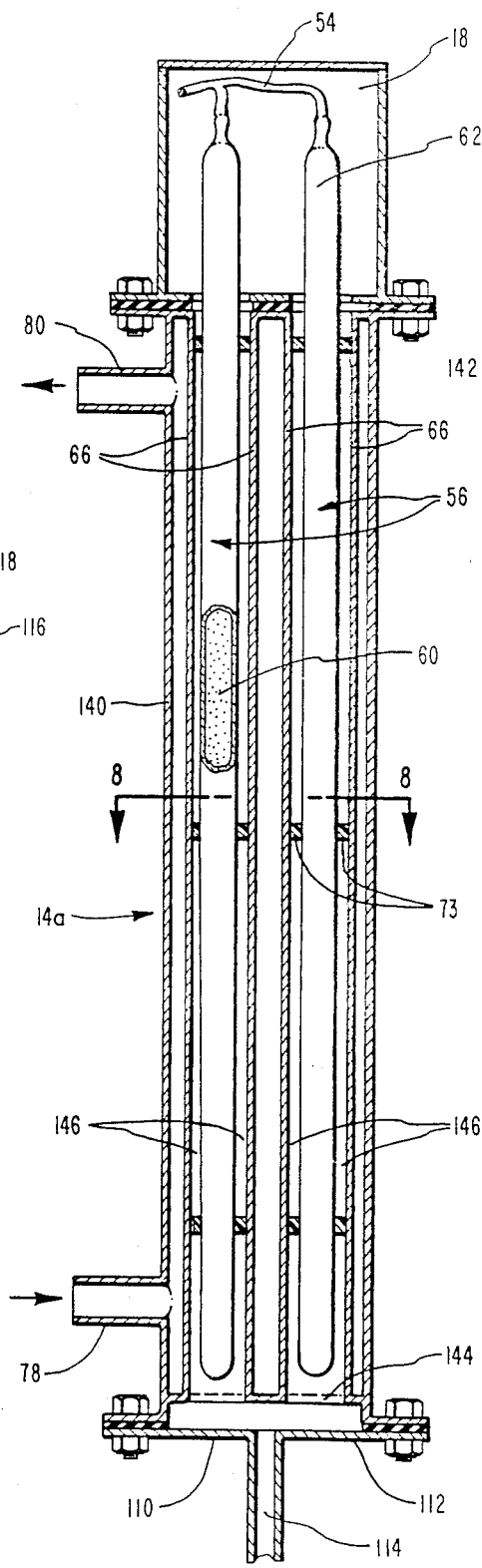
FIG. 7 is a cross-sectional elevation view of a second embodiment of an ozone generator unit incorporating teachings of the present invention.

FIGS. 7 and 8 taken together illustrate a second embodiment of a tubular ozone generator unit 14a which includes a plurality of cathodes 56 encircled by the housing 140 of a single shell-and-tube heat exchanger. Each inner electrode 56 is surrounded by a cylindrical, concentrically disposed outer electrode 66 and held separated therefrom by spacers 73 not shown in FIG. 8 in order to enhance clarity. The plurality of anodes 66 are welded at the top and bottom ends thereof to end plates 142, 144, respectively. This forms a cooling water jacket 146 into which cooling water may enter by way of water inlet 78 and from which cooling water may exit by way of water outlet 80. Although in theory any number of cathodes 56 could be used in such a configuration, FIGS. 7 and 8 show four such cathodes employed within a single cooling water jacket 146. Otherwise the structure of tubular ozone generator unit 14a is similar in all significant respects to that of tubular ozone generator unit 14 shown in FIG. 3.

The present invention also includes a method for purifying a fluid using ozone. In that method, a feed gas containing oxygen is supplied to one end of at least one reaction space created between a cylindrical anode and a dielectric cathode envelope. The cathode envelope is filled with an inert gas, and a high voltage alternating power source is applied to an electron gun located in one end of the dielectric envelope. This causes electrons to be emitted from the electron gun and focused into the dielectric envelope in alignment with and parallel to the longitudinal axis thereof. As a result, an electron haze is created in the dielectric envelope which induces various forms of electron focusing in the reaction space already described above. It is the electron focusing that generates ozone from the feed gas. In addition, the method of the present invention includes the step of injecting ozone generated in the reaction space into the fluid to be purified. Functioning is enhanced by the additional steps of cooling the reaction chamber with a fluid heat exchanger and by injecting ozone from the generator directly from each reaction space, if a plurality of same are employed.

The ozone yields from the device disclosed range from about 15 grams per hour at 0% relative humidity to about 10 grams per hour at 25% relative humidity for a single-tube ozone generator unit. In terms of power consumption, in the disclosed inner electrode structure, 100 grams of ozone can be produced for each kilowatt-hour of energy. This is about twice the product rate per kilowatt-hour as found in existing tube-type generator units. These produce 45–60 grams of ozone per kilowatt-hour. Operational experience with the inventive electrode structure has shown the failure rate due to shorting or arching at the electrode to be much less than that found in existing electrode structures. Thus, the use of the present invention results in more efficient and reliable operation than that of existing systems and lowers both the electrical costs and overall equipment expenses related to ozone production in repair and replacement of effective elements are considered.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. An apparatus for use with a source of high energy alternating electric power to generate ozone, said apparatus comprising:
   (a) a first electrode; and
   (b) an insulated second electrode comprising:
      (i) a sealed dielectric envelope having first and second portions, said first portion being positioned remote from said first electrode, and said second portion being positioned proximate to said first electrode, thereby to define between said second portion and said first electrode a reaction space wherein ozone is generated from an oxygen-bearing feed gas; and
      (ii) discharge means for generating electrical phenomena in said dielectric envelope, thereby to generate ozone from the feed gas in said reaction space, said discharge means comprising:
         (A) an inert gas under low pressure filling said dielectric envelope; and
         (B) an electric terminal located in said first portion of said dielectric envelope and being couplable through said dielectric envelope to said first electrode when the source of high energy alternating electric power is applied between said first electrode and said electric terminal.

2. An apparatus as recited in claim 1, wherein said dielectric envelope comprises an elongated tube, and wherein the dimension of said electric terminal in a direction parallel the longitudinal axis of said tube is less than or equal to one-half of the length of said elongated tube.

3. An apparatus as recited in claim 2, wherein the cross-section of said electric terminal taken in a plane normal to the longitudinal axis of said dielectric tube is similar in shape to the transverse cross-section of said dielectric tube.

4. An apparatus as recited in claim 3, wherein said electric terminal is comprised of an electron emitting material formed into a hollow cone, the small end of said cone being coupled to the source of high energy alternating electric power and the large end thereof being oriented away from said first end of said dielectric tube.

5. An apparatus as recited in claim 1, wherein said dielectric envelope comprises an elongated cylindrical glass tube.

6. An apparatus as recited in claim 1, wherein one of said first and said second electrodes is grounded.

7. An apparatus as recited in claim 6, wherein said first electrode is grounded.

8. An apparatus as recited in claim 1, wherein said first electrode is insulated.

9. An apparatus as recited in claim 1, wherein said first and second electrodes are separated by a gap.

10. An apparatus as recited in claim 1, wherein said first electrode encircles said second electrode.

11. An apparatus as recited in claim 10, wherein said second electrode is concentrically located within said first electrode.

12. An apparatus for generating ozone, said apparatus comprising:
   (a) a tubular outer electrode having open opposed first and second ends;
   (b) heat exchanger means located about said outer electrode for removing heat generated therein;
   (c) an elongated dielectric envelope having closed first and second ends, said dielectric envelope being located in said outer electrode with said first end of said dielectric envelope extending out of said outer electrode, thereby to form an elongated reaction space between said outer electrode and the exterior of the portion of said dielectric envelope located therein;
   (d) ventilation means for advancing a feed gas containing oxygen through said reaction space from said first to said second end of said outer electrode;
   (e) a source of high energy alternating electric power;

(f) an electrical lead from said source of electric power through and into said dielectric envelope;

(g) an inert gas in said dielectric envelope; and (h) an electric terminal connected to said electrical lead and located in said first end of said dielectric envelope, said terminal generating electrical phenomena in said inert gas, thereby to generate ozone in said reaction space.

13. An apparatus as recited in claim 12, wherein said heat exchanger means comprises a shell-and-tube heat exchanger wherein a cooling fluid circulates within a water jacket about the outside of said outer electrode.

14. An apparatus as recited in claim 13, wherein said cooling fluid comprises water.

15. An apparatus as recited in claim 13, wherein said cooling fluid comprises a gas.

16. An apparatus as recited in claim 10, wherein the cross-section of said electrical terminal taken in a plane normal to the longitudinal axis of said dielectric envelope is circular.

17. An apparatus as recited in claim 16, wherein said electrical terminal comprises a cone open at the large end thereof and connected at the small end thereof to said electrical lead, said large end of said cone being oriented toward said second end of said dielectric envelope with the axis of said cone being coincident with said longitudinal axis of said dielectric envelope.

18. An apparatus as recited in claim 17, wherein the dimension of said electrical terminal in a direction parallel the axis thereof is less than or equal to one-half of the length of said dielectric envelope.

19. An apparatus as recited in claim 10, wherein said first end of said dielectric envelope extends beyond said first electrode such that said electrical terminal is outside of said first electrode.

20. An apparatus as recited in claim 12, wherein said electrical phenomena generated in said inert gas by said electrical terminal comprises intermittent high voltage spikes from the exterior of said glass envelope to said outer electrode.

21. An apparatus as recited in claim 12, wherein said electrical phenomena generated in said inert gas comprises coronal discharges induced on the outer surface of said dielectric envelope.

22. An apparatus as recited in claim 12, wherein said dielectric envelope is located coaxially within said outer electrode and said reaction space is annular.

23. An apparatus for generating ozone, said apparatus comprising:
(a) a cylindrical outer electrode having open opposed first and second ends;
(b) heat exchanger means located about said outer electrode for removing heat generated therein;
(c) a cylindrical dielectric envelope having closed first and second ends, said dielectric envelope being partially located within said outer electrode with said first end of said dielectric envelope extending out of said outer electrode, thereby to form an elongated reaction space between said outer electrode and the exterior of the portion of said dielectric envelope located therein;
(d) ventilation means for advancing a feed gas containing oxygen through said reaction space from said first to said second end of said outer electrode;
(e) a source of high energy alternating electric power; and
(f) electrical means for inducing electron focusing in said reaction space thereby to generate ozone from the feed gas therein, said electrical means comprising:
(i) an inert gas in said dielectric envelope;
(ii) an electrical lead from said source of electric power through and into said dielectric envelope; and
(iii) an electric terminal located in said first end of said dielectric envelope and connected to said electrical lead.

24. An apparatus as recited in claim 23, wherein said heat exchanger means comprises a shell-and-tube heat exchanger wherein a cooling fluid circulates within a water jacket about the outside of said outer electrode.

25. An apparatus as recited in claim 24, wherein said cooling fluid comprises water.

26. An apparatus as recited in claim 24, wherein said cooling fluid comprises a gas.

27. An apparatus as recited in claim 23, wherein said electric terminal emits electrons and focuses said electrons into said inert gas to form an electron haze and voltage spikes throughout said dielectric envelope, said electron haze and high voltage spikes being field-coupled with said outer electrode and inducing intermittent high voltage spikes from the exterior of said dielectric envelope to said outer electrode.

28. An apparatus as recited in claim 27, wherein said voltage spikes induced in said dielectric envelope have a voltage in a range of about 40,000 to about 100,000 volts.

29. An apparatus as recited in claim 28 wherein said voltage spikes induces in said dielectric envelope have a voltage in the range of about 45,000 to 80,000 volts.

30. An apparatus as recited in claim 29 wherein said voltage spikes induced in said dielectric envelope have a voltage in the range of about 50,000 to 65,000 volts.

31. An apparatus as recited in claim 23, wherein the cross-section of said electrical terminal taken in a plane normal to the longitudinal axis of said dielectric envelope is circular.

32. An apparatus as recited in claim 31, wherein said electrical terminal comprises a cone open at the large end thereof and connected at the small end thereof to said electrical lead, said large end of said cone being oriented toward said second end of said dielectric envelope with the axis of said cone being coincident with said longitudinal axis of said dielectric envelope.

33. An apparatus as recited in claim 32, wherein the dimension of said electrical terminal in a direction parallel the axis thereof is less than or equal to one-half of the length of said dielectric envelope.

34. An apparatus as recited in claim 23, wherein said first end of said dielectric envelope extends beyond said outer electrode such that said electrical terminal is outside of said outer electrode.

35. An apparatus as recited in claim 23, wherein said electron focusing induced in said reaction space further comprises a virtual plasma in the reaction space created by magnetic attraction between said outer electrode and the contents of said dielectric envelope.

36. An apparatus as recited in claim 23, wherein said electron focusing induced in said reaction space further comprises coronal discharges induced on the outer surface of said dielectric envelope.

37. An apparatus as recited in claim 23, wherein said dielectric envelope is located coaxially with said outer electrode, and said reaction space is annular.

38. A system for purifying a fluid with ozone, the system comprising:

(a) a source of high energy alternating electric power;
(b) a tubular ozone generator unit comprising:
  (i) a elongated cylindrical outer electrode having open opposed first and second ends;
  (ii) a cylindrical dielectric envelope having closed first and second ends and being located in said outer electrode with said first end of said dielectric envelope extending out of said outer electrode, thereby to form an elongated reaction space between said outer electrode and the exterior of the portion of said dielectric envelope located therein;
  (iii) an inert gas under low pressure filling said dielectric envelope;
  (iv) an electrical lead from said source of electric power into said dielectric envelope; and
  (v) gun means located in said first end of said dielectric envelope for emitting high energy electrons and for focusing said high energy electrons towards the second end of said dielectric envelope into said inert gas to form an electron haze;
(c) heat exchanger means located about said outer electrode for removing heat generated therein;
(d) ventilation means for advancing feed gas containing oxygen through said reaction space from said first to said second end of said outer electrode, said electron haze in said dielectric envelope inducing electron focusing in said reaction space to generate ozone from said feed gas advanced by said ventilation means; and
(e) mixing means for injecting into the fluid the feed gas advanced from said first to said second end of said outer electrode.

39. A system as recited in claim 38, wherein said mixing means comprises:
  (a) an injection chamber connected to said reaction space at said second end of said outer electrode; and
  (b) an aspiration jet located in said injection chamber for passing the fluid.

40. A system as recited in claim 39, wherein said second end of said dielectric tube is inclined downwardly from said first end thereof at an angle of at least 5° to the horizontal, and wherein said system further comprises an acid trap at the lower end of said reaction space for collecting nitric acid generated therein, the inclination of said dielectric tube causing said nitric acid to drain out of said reaction space into said acid trap.

41. A system as recited in claim 40, wherein said acid trap is connected between said injection chamber and said second end of said reaction space.

42. A system as recited in claim 40, wherein said acid trap comprises a selectively removable acid reservoir for permitting the discarding of acid collected therein.

43. A system as recited in claim 38, wherein said heat exchanges means comprises a shell-and-tube heat exchanger in which a cooling fluid circulates within a water jacket about the outside of said anode.

44. A system as recited in claim 38, further comprising a particle filter for treating said feed gas containing oxygen advanced through said reaction space.

45. A system as recited in claim 38, further comprising a dryer for removing moisture from said feed gas containing oxygen advanced through said reaction space.

46. A system as recited in claim 38, wherein the fluid comprises water.

47. A system as recited in claim 38, wherein the fluid comprises ambient air.

48. An ozonation apparatus comprising:
(a) a plenum chamber for receiving oxygen-bearing feed gas from which to generate ozone;
(b) at least one tubular ozone generator unit in communication with said plenum chamber to permit oxygen-bearing feed gas therefrom to flow through said ozone generator unit, said ozone generator unit comprising:
  i. a water jacket surrounding said ozone generator unit for removing heat therefrom;
  ii. a cylindrical outer electrode extending through said water jacket; and
  iii. an inner electrode partially disposed within said outer electrode, thereby to define between said outer electrode and the portion of said inner electrode therewithin a reaction space through which said feed gas flows from said plenum chamber and wherein forms of electron focusing are developed and maintained by application of a source of high energy alternating electric power to said inner electrode relative said outer electrode, said inner electrode comprising:
    A. a tubular envelope of dielectric material filled with an inert gas at low pressure, said envelope having first and second portions, said first portion being positioned remote from said outer electrode and said second portion being positioned within said outer electrode;
    B. an electrical conductor sealed into and passing through a first end of said envelope of dielectric material and being couplable at the end thereof outside said envelope to said source of high energy alternating electric power; and
    C. an electric terminal of hollow conical construction located in said first end of said envelope of dielectric material and connected to the end of said electrical conductor interior thereto to excite in said inert gas electrical phenomena which are field-coupled to said outer electrode to develop said forms of electron focusing and to generate ozone in said reaction space.

49. An ozonation apparatus as recited in claim 48, wherein said inner electrode is coaxially disposed within said outer electrode and said reaction space is annular.

50. An ozonation apparatus as recited in claim 49, further comprising ventilation means for drawings said feed gas into said annular reaction space due to an area of low pressure developed at the end of said annular reaction space opposite from said plenum chamber and for injecting ozone from said ozone generator unit into a material to be ozonated.

51. An ozonation apparatus as recited in claim 50, wherein said material to be ozonated is water and a portion of said water passes through said water jacket.

52. An ozonation apparatus as recited in claim 51, wherein said ventilation means injects ozone from said ozone generator unit into said water at a point prior to said portion of said water entering said water jacket, thereby to mix said ozone with said portion of said water in the turbulent flow thereof through said water jacket.

53. An ozonation apparatus as recited in claim 48, wherein said feed gas enters said plenum through a feed gas dryer.

54. An ozonation apparatus as recited in claim 48, wherein said feed gas enters said plenum through a particle filter.

55. An ozonation apparatus as recited in claim 48, wherein said plenum chamber is provided with a hermetically sealing selectively removable cover.

56. An ozonation apparatus as recited in claim 48, wherein the longitudinal axis of said ozone generator unit is oriented at an angle in a range between about 5° and approximately 90° to the horizontal for draining acid formed in said annular reaction space to the lower end thereof.

57. An ozonation apparatus as recited in claim 56, further comprising an acid trap for collecting acid drained from said annular reaction space, said acid trap being located at said lower end of said annular reaction space and being connected between said lower of said annular reaction space and said area of low pressure developed by said ventilation means.

58. An ozonation apparatus as recited in claim 57, wherein said acid trap comprises:
(a) a cap; and
(b) a collecting vessel for said acid selectively sealable to said cap and vented therethrough to said lower end of said annular reaction space and to said area of low pressure developed by said ventilation means.

59. An inner electrode for use with an encircling outer electrode of a tubular ozone generator, said inner electrode comprising:
(a) envelope means for electrically containing high energy electrical phenomenon, said envelope means being so configured as to be positioned in the encircling outer electrode with a first portion of said envelope means extending out of the outer electrode;
(b) carrier means filling said envelope means for diffusing said high energy electrical phenomena throughout the interior thereof; and
(c) gun means located in said first portion of said envelope means for emitting high energy electrons and for focusing said high energy electrons into said carrier means, thereby to produce said high energy electrical phenomena.

60. An inner electrode as recited in claim 59, wherein said envelope means comprises an elongated dielectric tube closed at both ends thereof and having a first end thereof corresponding to said first portion of said envelope means.

61. An inner electrode as recited in claim 60, wherein said dielectric comprises glass.

62. An inner electrode as recited in claim 59, wherein said carrier means comprises an inert gas in said envelope means.

63. An inner electrode as recited in claim 59, wherein said carrier means comprises an inert gas.

64. An inner electrode as recited in claim 59, wherein said carrier means comprises a gas at a low pressure.

65. An inner electrode as recited in claim 60, wherein said gun means comprises an electrical terminal located in said first end of said dielectric tube and electrically couplable therethrough to a source of high voltage alternating electric power, said electrical terminal when coupled thereto emitting electrons in alignment with and parallel to the longitudinal axis of said dielectric tube.

66. An inner electrode as recited in claim 65, wherein the cross-section of said electrical terminal taken in a plane normal to the longitudinal axis of said dielectric tube is similar in shape to the transverse cross-section of said dielectric tube.

67. An inner electrode as recited in claim 66, wherein said dielectric tube is cylindrical and said cross-section of said electrical terminal taken in a plane normal to the longitudinal axis of said dielectric tube is circular.

68. An inner electrode as recited in claim 65, wherein said electrical terminal comprises a cone open at the large end thereof and coupled at the small end thereof to said source of high energy alternating electric power, said large end of said cone being oriented opposite said first end of said dielectric tube with the axis of said cone coincident with said longitudinal axis of said dielectric tube.

69. An inner electrode as recited in claim 65, wherein the dimension of said electrical terminal in a direction parallel the longitudinal axis of said dielectric tube is less than or equal to one-half of the length of said dielectric tube.

70. An inner electrode as recited in claim 65, wherein said electrical terminal is comprised of an electron-emitting material.

71. An inner electrode as recited in claim 65, wherein said electrical terminal is provided with a getter material.

72. An inner electrode as recited in claim 59, wherein said gun means comprises a conical electrical terminal located in said first portion of said envelope means with the small end of said electrical terminal connected to a source of high voltage alternating electric power and the large end thereof being oriented away from said first portion of said envelope means.

73. An inner electrode as recited in claim 72, wherein said large end of said electrical terminal is open.

74. An inner electrode for use with an encircling outer electrode of a tubular ozone generator, said inner electrode comprising:
(a) a closed glass tube having opposed first and second ends and being so configured as to be positioned in the encircling outer electrode with said first end of said glass tube extending out of the outer electrode;
(b) an inert gas in said glass tube;
(c) an electrical lead passing through said first end of said glass tube and being couplable on the exterior thereof to a source of high energy alternating electric power; and
(d) an electric terminal located in said first end of said glass tube and connected to said electrical lead to emit electrons in alignment with and parallel to the longitudinal axis of said glass tube.

75. An inner electrode as recited in claim 74, wherein said inert gas is at a pressure less than 100 torr.

76. An inner electrode as recited in claim 74, wherein the cross-section of said electrical terminal in a plane normal to the longitudinal axis of said glass tube is circular.

77. An inner electrode as recited in claim 76, wherein said electrical terminal comprises a cone, the small end of said cone being connected to said electrical lead, and the large end of said cone being oriented toward said second end of said glass tube.

78. An inner electrode as recited in claim 77, wherein said large end of said electrical terminal is open.

79. An inner electrode as recited in claim 74, wherein said electrical terminal comprises an electron-emitting material and a getter material.

80. An apparatus as recited in claim 1, wherein said electric terminal is directly coupled to the source of high energy alternating electric power.

81. An apparatus as recited in claim 2, wherein the dimension of said electric terminal in a direction parallel the longitudinal axis of said tube is less than or equal to one-tenth of the length of said tube.

82. An apparatus as recited in claim 81, wherein the dimension of said electric terminal in a direction parallel the longitudinal axis of said tube is less than or equal to one-twentieth of the length of said tube.

83. An apparatus as recited in claim 16, wherein said first and second electrodes have circular transverse cross sections.

84. An apparatus as recited in claim 83, wherein said second electrode is concentrically located within said first electrode.

85. An apparatus as recited in claim 12, wherein ozone is generated in said reaction due to field-coupling between said outer electrode and the contents of said dielectric envelope.

86. An apparatus as recited in claim 18, wherein the dimension of said electric terminal in a direction parallel the axis thereof is less than or equal to one-twentieth of the length of said dielectric envelope.

87. An inner electrode as recited in claim 69, wherein the dimension of said electric terminal in a direction parallel to the longitudinal axis of said dielectric tube is less than or equal to one-tenth of the length of said dielectric tube.

88. An inner electrode as recited in claim 87, wherein the dimension of said electric terminal in a direction parallel to the longitudinal axis of said dielectric tube is less than or equal to one-twentieth of the length of said dielectric tube.

89. An inner electrode as recited in claim 74, wherein the dimension of said electric terminal in a direction parallel the longitudinal axis of said glass tube is less than or equal to one-twentieth of the length of said glass tube.

* * * * *